United States Patent
Kahtava et al.

(10) Patent No.: US 10,531,383 B2
(45) Date of Patent: Jan. 7, 2020

(54) COMMUNICATIONS SYSTEM, INFRASTRUCTURE EQUIPMENT, COMMUNICATION TERMINAL AND METHOD

(71) Applicant: SONY CORPORATION, Tokyo (JP)

(72) Inventors: Jussi Kahtava, Basingstoke (GB); Derek John Richards, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 195 days.

(21) Appl. No.: 14/916,897

(22) PCT Filed: Aug. 4, 2014

(86) PCT No.: PCT/EP2014/066737
§ 371 (c)(1),
(2) Date: Mar. 4, 2016

(87) PCT Pub. No.: WO2015/036173
PCT Pub. Date: Mar. 19, 2015

(65) Prior Publication Data
US 2016/0212706 A1    Jul. 21, 2016

(30) Foreign Application Priority Data

Sep. 11, 2013 (EP) ................................. 13184005

(51) Int. Cl.
*H04W 36/00* (2009.01)
*H04W 4/00* (2018.01)
(Continued)

(52) U.S. Cl.
CPC ....... *H04W 52/0225* (2013.01); *H04W 36/26* (2013.01); *H04W 36/30* (2013.01);
(Continued)

(58) Field of Classification Search
CPC ... H04W 36/165; H04W 36/26; H04W 36/30; H04W 52/0225; H04W 52/0229;
(Continued)

(56) References Cited

U.S. PATENT DOCUMENTS

2007/0173279 A1*   7/2007   Kuroda ................. H04W 52/12
                                                           455/522
2007/0225051 A1*   9/2007   Nader .................. H04B 17/309
                                                           455/574
(Continued)

OTHER PUBLICATIONS

International Search Report dated Oct. 27, 2014 in PCT/EP2014/066737.

(Continued)

*Primary Examiner* — Rafael Pérez-Gutiérrez
*Assistant Examiner* — Mark G. Pannell
(74) *Attorney, Agent, or Firm* — Xsensus LLP

(57) ABSTRACT

A communications system for communicating data to and from a communication terminal, including infrastructure equipment forming a mobile communications network arranged to transmit and receive signals representing data to and from the communication terminal via a wireless access interface. The communication terminal is configured to transmit and receive signals representing data to/from the infrastructure equipment and to enter a reduced-power state, during which the communication terminal is configured to periodically recover data from the signals received from the infrastructure equipment, to measure a parameter indicating a characteristic of at least some of the signals received from the infrastructure equipment during the reduced power state, and to exit the reduced power state and to transmit a message to the infrastructure equipment, the message requesting resources of the wireless access interface, in dependence upon the measured parameter relative to a predetermined threshold.

15 Claims, 12 Drawing Sheets

(51) Int. Cl.
  *H04B 7/00* (2006.01)
  *H04W 52/02* (2009.01)
  *H04W 36/26* (2009.01)
  *H04W 36/30* (2009.01)
  *H04W 72/08* (2009.01)
  *H04W 76/28* (2018.01)
  *H04W 36/16* (2009.01)

(52) U.S. Cl.
  CPC ..... *H04W 52/0229* (2013.01); *H04W 72/085* (2013.01); *H04W 76/28* (2018.02); *H04W 36/165* (2013.01); *H04W 52/0245* (2013.01); *Y02D 70/00* (2018.01); *Y02D 70/1262* (2018.01); *Y02D 70/21* (2018.01); *Y02D 70/24* (2018.01); *Y02D 70/25* (2018.01)

(58) Field of Classification Search
  CPC ........... H04W 52/0245; H04W 72/085; H04W 76/048; Y02B 60/50
  USPC ....................................................... 455/437
  See application file for complete search history.

(56) References Cited

U.S. PATENT DOCUMENTS

| | | | | |
|---|---|---|---|---|
| 2008/0232326 | A1* | 9/2008 | Lindoff | H04W 36/30 370/332 |
| 2010/0151878 | A1* | 6/2010 | Nader | H04W 52/0225 455/456.1 |
| 2011/0269462 | A1 | 11/2011 | Sägfors et al. | |
| 2012/0207040 | A1 | 8/2012 | Comsa et al. | |
| 2012/0281563 | A1* | 11/2012 | Comsa | H04W 24/10 370/252 |
| 2012/0281570 | A1* | 11/2012 | Jung | H04L 1/1854 370/252 |
| 2013/0045770 | A1 | 2/2013 | Aschan et al. | |
| 2014/0243038 | A1* | 8/2014 | Schmidt | H04W 4/90 455/552.1 |
| 2015/0045035 | A1* | 2/2015 | Nigam | H04W 36/30 455/436 |

OTHER PUBLICATIONS

"Measurement in DRX" Samsung, 3GPP TSG-RAN2 Meeting #59 bis, R2-074223, XP050136842, Oct. 2007, 4 Pages.

"LTE; Evolved Universal Terrestrial Radio Access (E-UTRA); Radio Resource Control (RRC); Protocol specification" (3GPP TS 36.331 version 11.4.0 Release 11) ETSI TS 136 331 V11.4.0, Jul. 2013, 350 Pages.

"LTE; Evolved Universal Terrestrial Radio Access (E-UTRA); Radio Resource Control (RRC); Protocol specification" (3GPP TS 36.331 version 11.3.0 Release 11) ETSI TS 136 331 V11.3.0, Apr. 2013, 348 Pages.

"LTE; Evolved Universal Terrestrial Radio Access (E-UTRA); Requirements for support of radio resource management" (3GPP TS 36.133 version 11.4.0 Release 11) ETSI TS 136 133 V11.4.0, Apr. 2013, 678 Pages.

* cited by examiner

COMMUNICATIONS SYSTEM, INFRASTRUCTURE EQUIPMENT, COMMUNICATION TERMINAL AND METHOD

CROSS-REFERENCE TO RELATED APPLICATIONS

The present application is based on PCT filing PCT/EP2014/066737 filed Aug. 4, 2014, and claims priority to European Patent Application 13184005.0, filed in the European Patent Office on 11 Sep. 2013, the entire contents of each of which being incorporated herein by reference.

FIELD OF THE DISCLOSURE

The present disclosure relates to communications systems, infrastructure equipment and communications terminals for communicating data and methods of communicating data.

BACKGROUND OF THE DISCLOSURE

Extending network coverage, reducing power consumption and increasing network capacity and efficiency are some of the technical challenges which affect the design and deployment of mobile communications networks. One approach to reduce the power consumed by a user device and to increase network efficiency is to decrease the time spent transmitting and receiving signals and recovering data from received signals at both user devices and serving base stations. For example, if it is known by a user device that data intended for it is not to be transmitted within a predetermined period of time, the user device is able to cease recovering data from signals received during this period of time, thus reducing power consumption. Likewise, network resources can also be freed-up because the serving base station will not transmit data to the user device during this period. This approach is known as discontinuous reception. During discontinuous reception, data intended for the user device is periodically transmitted by a serving base station and data is only periodically recovered from signals transmitted by the serving base station, thus allowing the user device to periodically power-down its receiver when it knows that no data will be transmitted to it.

In cellular mobile communications networks, base stations are deployed to provide radio coverage to communications terminals. However each base station will have a limited coverage area and so, as far as possible, the coverage area provided by each base station is arranged to overlap the coverage area of it's neighbouring base stations. In order to maintain an ability to communicate data whilst roaming throughout the coverage area of a mobile communications network, a communications terminal is arranged to "handover" or "hand-off" from one base station to another as the communications terminal passes out of the radio coverage area of one base station and enters the coverage area of another base station. If handover is not successful then link failure may occur between the communications terminal and the mobile communications network. Re-connecting to the mobile communications network after link failure is often a resource intensive procedure both in terms of communications terminal resources and network resources, and also disrupts communications between the communications terminal and the serving base station. It is therefore desirable to reduce the likelihood of link failure.

SUMMARY OF THE INVENTION

According to an example embodiment of the present disclosure, there is provided a communications system for communicating data to and from a communication terminal. The system comprises infrastructure equipment for forming a mobile communications network arranged to transmit and receive signals representing data to and from the communication terminal via a wireless access interface and the communication terminal is configured to transmit and receive signals representing data to and from the infrastructure equipment. The communication terminal is configured to enter a reduced-power state, during which the communication terminal is configured to periodically recover data from the signals received from the infrastructure equipment, to measure a parameter indicating a characteristic of at least some of the signals received from the infrastructure equipment during the reduced power state, and to exit the reduced power state and to transmit a message to the infrastructure equipment, the message requesting resources of the wireless access interface, in dependence upon the measured parameter relative to a predetermined threshold.

According to the example embodiment a communications terminal is arranged to exit from a reduced power state in response to a quality of a link between the communication terminal and the infrastructure equipment varying relative to a threshold, for example in response to the link quality falling below the threshold. This therefore reduces a subsequent delay between detecting a handover initiating event and reporting the event to the infrastructure equipment compared to a communication terminal which remains in the reduced power state and does not report a handover event until a next scheduled transmission. Accordingly, these features increase the likelihood that a handover to another infrastructure equipment can take place before the link with the serving infrastructure equipment fails and a re-connection procedure is required. The reduction in re-connection procedures reduces power consumption at the communications terminal and also reduces the network resources occupied by re-connection procedures.

According to another example embodiment of the present disclosure the reduced-power state includes a first period during which the communication terminal is configured to recover data from the signals received from the infrastructure equipment and a second period during which the communication terminal is configured not to recover data from the signals received from the infrastructure equipment, and the communication terminal is configured to measure the parameter during the second period.

This feature allows the communications terminal to exit the reduced power state during the second period and then subsequently report a handover event with little delay. Conversely, for a communication terminal which does not exit the reduced power state, it will be required to wait at least a first period after a handover initiating event has occurred to report any event, thus possibly incurring increased delay.

According to another example embodiment of the present disclosure the infrastructure is equipment is configured to allocate resources in response to receiving the message for requesting resources, and the communication terminal is configured to transmit a reporting message to the infrastructure equipment in the allocated resources, the reporting message indicating the measured parameter relative to the predetermined threshold.

This feature allows the communications terminal to establish a fully active connection to the infrastructure equipment once it has exited the reduced power state. This therefore allows the communication terminal to report subsequent events such as a handover initiating event as soon as they occur rather than waiting until a scheduled transmission in the reduced power state.

According to another example embodiment of the present disclosure the parameter is a received power of a reference signal transmitted by the infrastructure equipment The measurement of the received power of reference signals allows the communication device to monitor a quality of the link between the communication and the infrastructure equipment without recovering data from received signals. This therefore enables the communications device to remain in the reduced power state whilst still monitoring link quality.

According to another example embodiment of the present disclosure the predetermined threshold is higher than a threshold associated with a handover initiating event.

The relative level of the threshold for bringing the communications terminal out of the reduced power state ensures that the communication devices exits the reduced power state prior to a handover initiating event occurring.

According to another example embodiment of the present disclosure the predetermined threshold is determined by the infrastructure equipment and the communications terminal is provided with an indication of the predetermined threshold.

This allows the infrastructure equipment to vary the threshold dependent upon the traffic conditions in the network. For example, if the network is congested the threshold may be lowered so that communications terminals are less likely to exit the reduced power state and request resources in the wireless access interface.

According to another example embodiment of the present disclosure the predetermined threshold is hardcoded into the communications terminal.

Hardcoding the threshold overcomes the need for the infrastructure equipment to indicate the threshold to the communications terminal, thus conserving resources of the wireless access interface.

Various further aspects and embodiments of the disclosure are provided in the appended claims, including but not limited to a communications terminal, an infrastructure equipment and methods of communicating between a communications terminal and an infrastructure equipment.

BRIEF DESCRIPTION OF THE DRAWINGS

Embodiments of the present disclosure will now be described by way of example only with reference to the accompanying drawing in which like parts are provided with corresponding reference numerals and in which.

DETAILED DESCRIPTION OF EXAMPLE EMBODIMENTS

Mobile Communications Network

Figure 1:
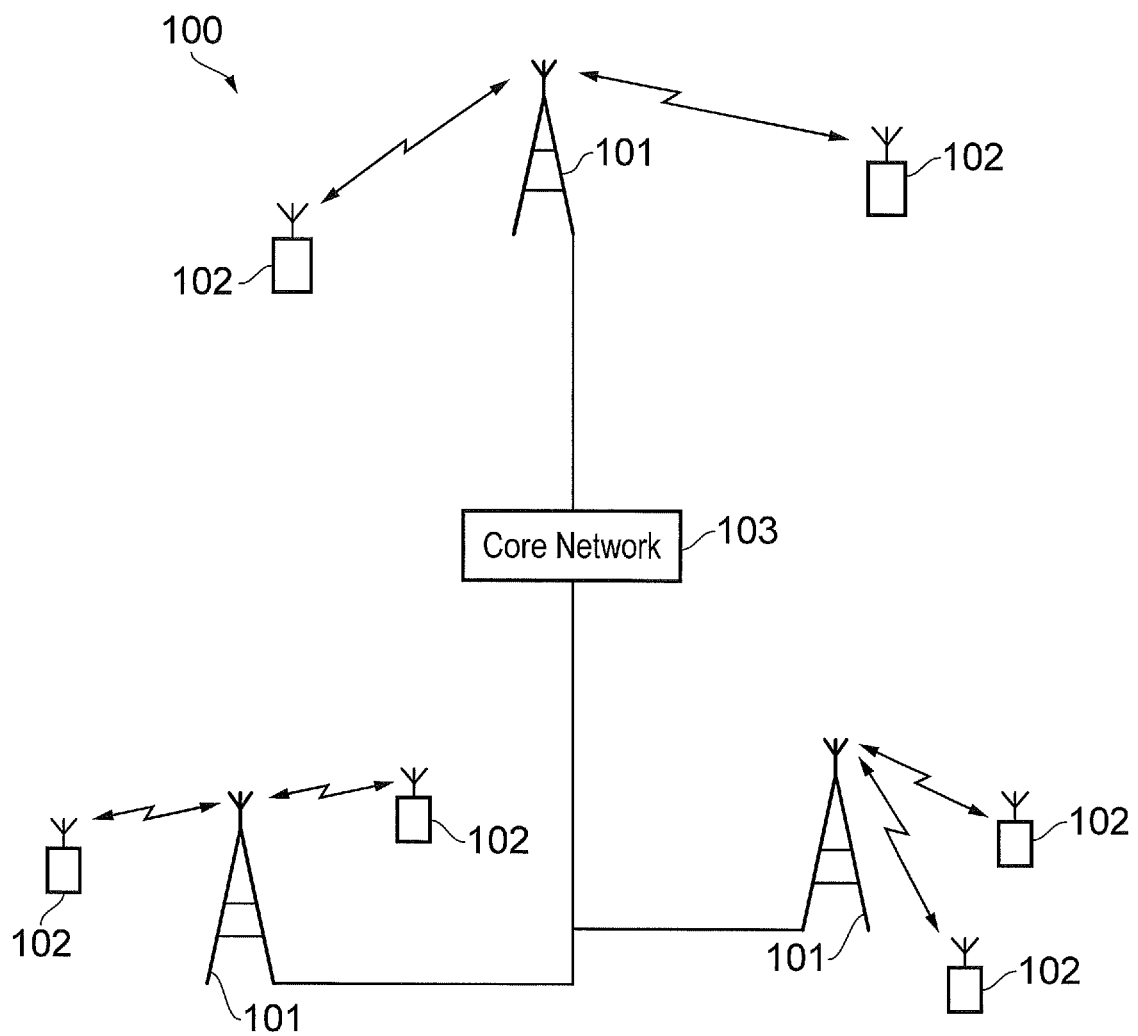
FIG. 1 provides a schematic diagram of a mobile communications network.

FIG. 1 provides a schematic diagram of an example mobile communications network 100. The mobile communications network includes infrastructure equipment 101 which is arranged to provide a wireless access interface to communications terminals 102 within a coverage area or cell. Signals representing downlink data are transmitted from the infrastructure equipment and received by the communication terminals via the wireless access interface, and signals representing uplink data are transmitted by the communication terminals and received by the infrastructure equipment via the wireless access interface. The infrastructure equipment may be communicatively linked via a core network to other infrastructure equipment which may in turn be linked to further communications networks. The infrastructure equipment may also be referred to as a base station or an enhanced node B (eNode B) and the communications terminals may be referred to as user equipment (UE), mobile devices and user devices etc., where these devices may take the form of smart phones, tablet computers or machine type communications (MTC) devices for example. In some examples the communications network of FIG. 1 may operate in accordance with 3GPP Long Term Evolution (LTE) where the communication terminals also operate in accordance with LTE.

Figure 2:
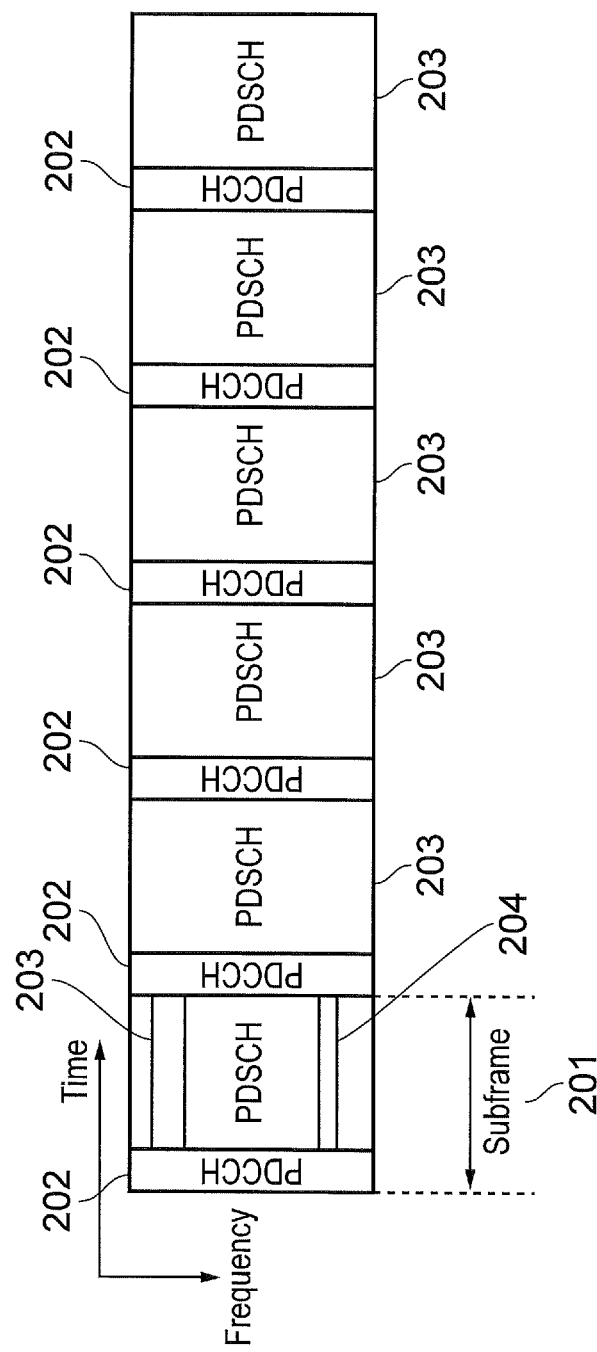
FIG. 2 provides a schematic diagram of example 3GPP Long Term Evolution (LTE) subframes.

In one example the wireless access interface of the network 100 may be provided by an orthogonal frequency division multiplexing interface, where the bandwidth allocated to the network is divided in frequency into a plurality of orthogonal lower bandwidth subcarriers and divided in time into subframes and frames of a specified duration. FIG. 2 provides a simplified example of the downlink of the wireless access interface when provided by OFDM in accordance with LTE. Each subframe 201 is 1 ms in duration and may be further divided into two slots of 0.5 ms duration. Subframes may be grouped together into frames which are formed from 10 subframes. Each subframe may include user plane and control plane data, where control plane data may for example be conveyed across a physical downlink control channel (PDCCH) and user plane data conveyed across a physical downlink shared channel (PDSCH). Resources of the subframes are allocated to different UEs such that data intended for a UE is transmitted in resources allocated to the UE, and an indication of the allocation is provided in the control channel PDCCH. For example, in FIG. 2, resource 203 may be allocated to a first UE and resources 204 may be allocated to second UE. When receiving data at a UE, the UE first detects and estimates control data in the PDDCH which indicates the resources in the PDSCH that have been allocated to it. The UE then detects and estimates the data from the appropriate resources of the PDSCH. Consequently, the UE may be required to recover control data from the signals in the PDCCH of each subframe via estimation and detection in order to establish whether there is data intended for it in the PDSCH. Although the wireless access interface has only been described with reference to the PDCCH and the PDSCH, control plane and user plane data may also be transmitted in a range of other physical channels. For instance, information on the format of data being conveyed by the wireless access interface may be conveyed on the physical format indicator channel (PFICH), system information for UEs attempting to access the network may be conveyed in the physical broadcast channel (PBCH) and repetition control information may be conveyed in the physical hybrid ARQ indicator channel (PHICH). The wireless access interface of the uplink may also be divided into separate physical channels, for instance in LTE an uplink subframe may comprise a user plane physical channels physical uplink shared channel (PUSCH) and a control plane physical uplink control channel (PUCCH).

In addition to the physical layer, the mobile communication network may also include higher protocol layers which operate in both the UE and eNode B, and provide a link between the physical layer channels and higher layers. For example, in LTE a medium access control (MAC) protocol layer is an example of such a protocol layer. The MAC protocol layer performs mapping between transport, logical and physical channels and may also preform further tasks such as correction via hybrid ARQ (HARQ). The MAC protocol layer also take protocol data units (PDU) from higher layers such as the radio link control (RLC) protocol layer and transform the data such that is it ready for transferring across the physical layers channels. The radio link control (RLC) protocol layer may also exist in both the UE and eNode B and acts as a link between the MAC protocol layers and higher layers. The RLC transforms data received from higher layers into PDU for transfer to the MAC protocol layer and may also perform protocol error detection and recovery, and ARQ.

In order for a UE to send and receive user plane data to and from its serving eNode B the UE is required to have established a connection to the eNode B. In LTE a UE is required to be in a radio resource controller connected (RRC_Connected) state if it is to be allocated resources in the uplink and downlink of the wireless access interface and transmit and receive data. If a UE is in an unconnected state (RRC_Idle) then it is required that a connection or re-connection procedure is followed. For example, if a UE is in an RRC_Idle as a consequence of experiencing a radio link failure, the UE may be required to perform a re-establishment procedure which involves performing a random access request for resources as defined the LTE standard. The cause of radio link failure and the re-establishment procedure are described in more detail below.

Discontinuous Reception

Reduction of power consumption in a UE is an objective in the development of mobile communications systems and enables UEs to be able to be utilised in new environments where frequent charging or battery replacement is not possible. The recovery and transmission of data and signals by a UE are some of the most power intensive tasks performed by UEs, therefore reducing the time that a UE spends recovering data from received signals and the time spent transmitting signals is beneficial. In LTE an approach to achieving this includes defining reduced-power states termed discontinuous reception (DRX) and discontinuous transmission (DTX), during which the reception and transmission of signals is significantly reduced, respectively. During a DRX state a UE periodically detects and estimates data such that the communication device does not recover data from every instance of the PDSCH and is therefore not required to detect and estimate data from the PDCCH of each subframe, thus reducing power consumption.

Coordination between a UE and serving eNode B is required in order to preform DRX in LTE systems so that data intended for the UE is only transmitted when the UE is configured to receive signals and recover data from those signals. Consequently, the starting point of a DRX cycle is explicitly determined by a UEs identity, such as the system architecture evolution (SAE) temporary mobile subscriber identity (S-TMSI) or mobility management entity (MME) that it is connected to. The use of these parameters therefore ensure that both the UE and the network always know at which subframe the UE will be active and listening to/recovering data from the PDCCH. The length of a DRX cycle is set by RRC signalling and also determines the frequency that the UE receives data from the PDCCH.

Figure 3:
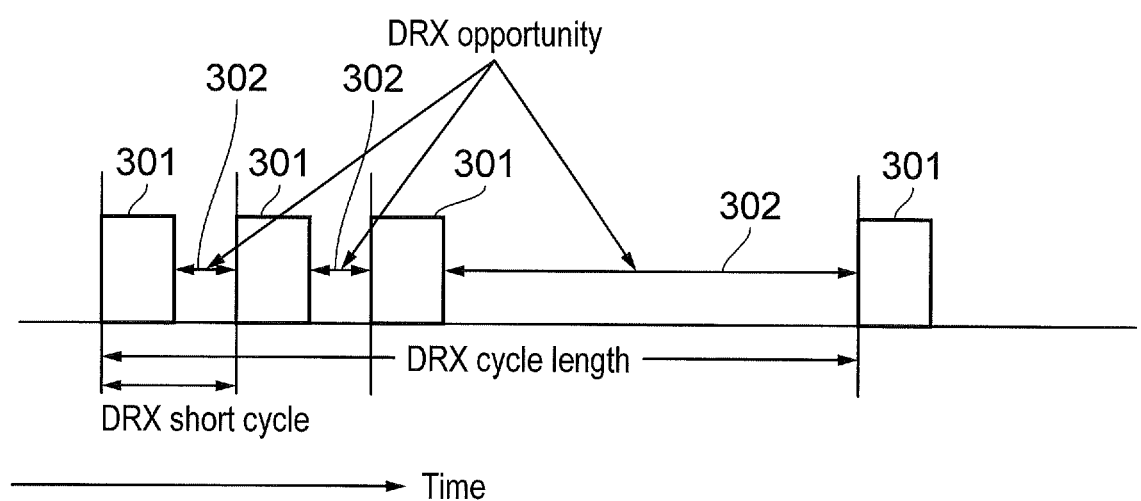
FIG. 3 provides a schematic diagram of an LTE discontinuous reception (DRX) cycle.

FIG. 3 provides a diagram of example DRX timings. Periods 301 represent periods (DRX_On) in which the UE is configured to receive signals representing data and detect and estimate the data contained therein. For example, a UE in a DRX state will recover data from PDCCH instances which fall within the DRX_On periods 301. If within the PDCCH it is indicated that data intended for the UE is present in the associated PDSCH, the UE will then recover that data. As previously mentioned, the serving eNode B is aware of the DRX_On periods and therefore transmits data intended for the UE in subframes that fall within the DRX_On period. Outside of DRX_On periods but within the DRX cycle, there are what may be referred to as DRX_Opportunities 302, in which the UE is configured not to detect and estimate data from the signals so that the receiver of the UE can be powered down and power consumption reduced. As illustrated in FIG. 3, although DRX is cyclic the periodicity may change. For example, in LTE in the absence of any indication of transmission to the UE in PDCCH, or uplink scheduling requests in a number of consecutive short DRX_On periods, the short cycles may be followed by a longer DRX_Opportunity in order to reduce power consumption further. However, although the DRX cycles may vary in length, the DRX cycle length in subframes is an integer multiple of the DRX short cycle length.

Radio Link Failure and Handover

As a result of changing environmental conditions and movement of UEs, channels across which signals representing control plane and user plane data are sent and received may vary. Consequently, a communications link between a UE and a particular eNode B may be liable to fail if the channel deteriorates significantly. For instance, a UE which is mobile may move out a coverage area provided by a serving eNode B and therefore no longer be able to transmit to and receive data to and from the eNode B. If this occurs before a UE has performed a handover to another eNode B, a radio link failure may occur, signifying that data can not be reliable communicated. A loss of synchronisation between the UE and eNode B is an example of radio link failure as synchronisation is required to order to detect and estimate data accurately. In an LTE system the occurrence of a radio link failure may be determined by the UE or the eNode B, for example a radio link failure may be determined at the UE by The RLC indicating that a maximum number of retransmissions of data has been reached.

An out-of-synch timer has expired therefore indicating that the number of consecutive out-of-sync indications from lower layers has reached an out-of-sync threshold and a number of consecutive in-synch indications has not reached an in-sync threshold.

The MAC layer indicates a random access problem while none of the RRC connection and re-establishment timers are currently running.

Alternatively, a radio link failure may be determined at the eNode B by

The RLC indicating that a maximum number of retransmissions of data has been reached A timer expires before the energy of reference symbols, such as Sounding Reference Symbols, recovers above a signal-to-interference-plus-noise ratio (SINR) threshold.

Figure 4:
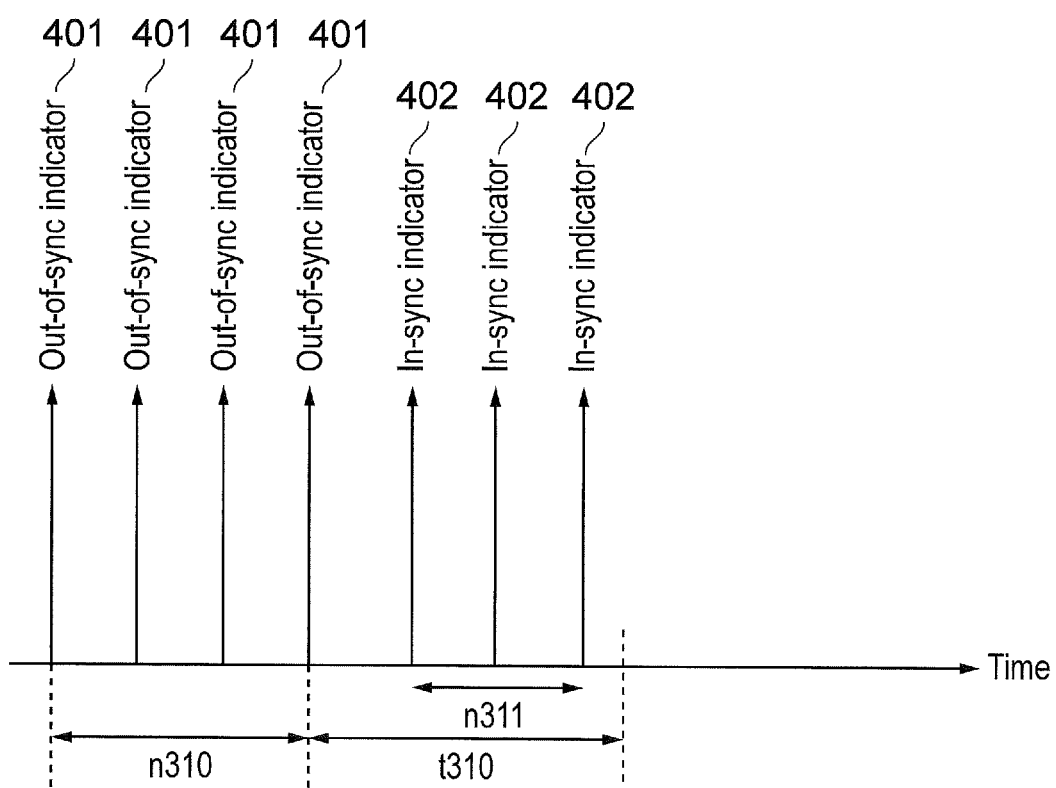
FIG. 4 provides a schematic diagram of the triggering of radio link failure in LTE user equipment (UE)

FIG. 4 provides an example of the operation of the aforementioned out-of-sync indicators at a UE. The reception of four out-of-sync indications 401 (n310=4) from the physical layer begins the timer t310. If n311 consecutive in-sync indications 302 are not received from the physical layer during the timer t310, at the expiry of the timer t310 the UE determines that radio link failure has occurred and may attempt to re-establish an RRC connection or transition to RRC_Idle state. If n311 in-sync indications are received from the physical layer within the t310 period the timer is stopped and the UE deems that it is synchronised with its serving eNode B.

In LTE communications networks, after determining radio link failure a UE initiates an RRC connection re-establishment procedure in which it requests re-establishment of the RRC connection with the network. This procedure re-establishes the radio bearer connections such as signalling radio bearer 1 (SRB1) and retains the existing Access Stratum security. However, if the serving eNode B does not support RRC connection re-establishment, the RRC connection is broken and the UE must start again from RRC_Idle. The UE also must have a valid context in order for RRC re-establishment take place, for instance, that it has recently lost a RRC connection with the eNode B.

Figure 5:
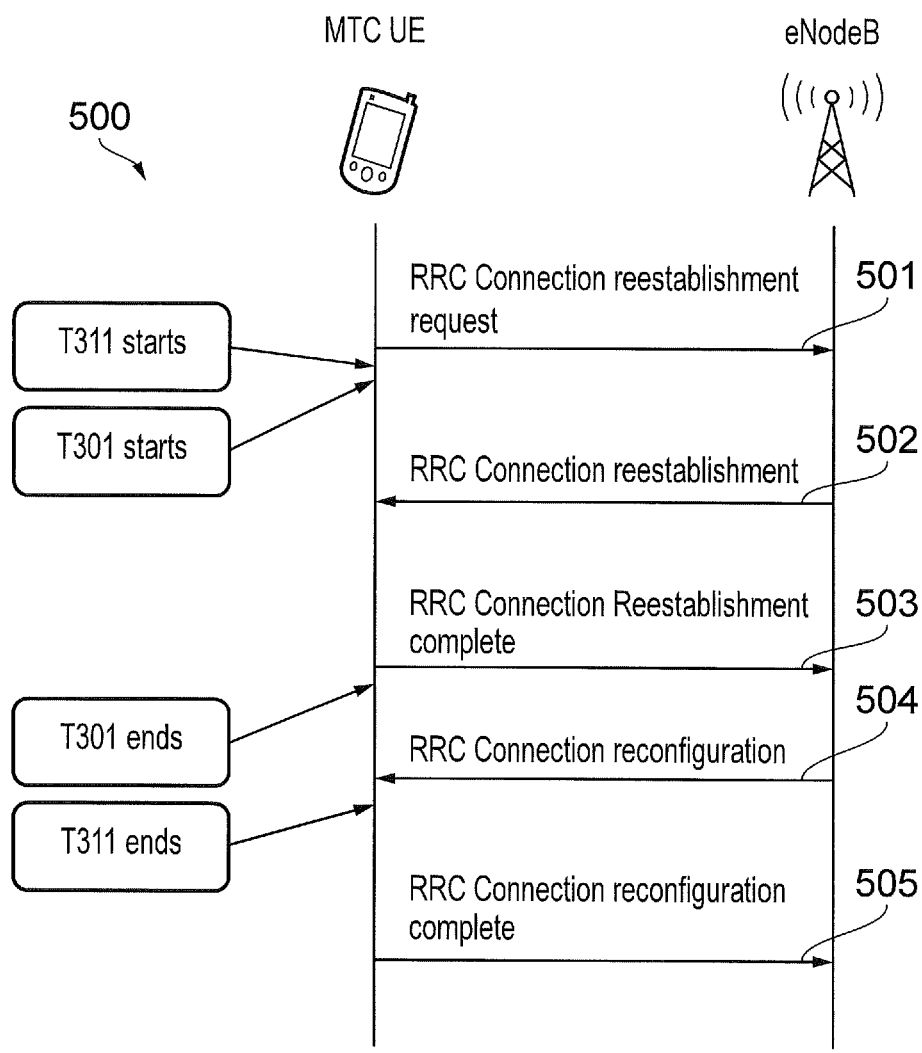
FIG. 5 provides a schematic diagram of an LTE radio resource controller (RRC) re-establishment request procedure.

FIG. 5 provides an example RRC re-establishment procedure 500 in an LTE system, where the use of the timers termed t311 and t301, provide a means to monitor the progress of the re-establishment procedure. Timer t311 starts when a RRC re-establishment procedure 500 is initiated and the t301 timer starts when an RRC re-establishment request message 501 is sent by the UE. In a successful re-establishment procedure an RRC connection re-establishment message 502 will then be transmitted by the eNode B and a RRC connection re-establishment complete message 503 sent in response to the eNode B from the UE, where the RRC connection re-establishment complete message 503 stops the timer t301. A subsequent RRC connection reconfiguration message 504 is then transmitted by the eNode B, the reception of which at the UE stops the timer t311. Finally a RRC connection reconfiguration complete message 505 is transmitted from the UE to the eNode B.

Expiry of the timer t311 indicates that the RRC re-establishment procedure has failed and therefore the UE transitions to an RRC_Idle state. Similarly, expiry of the timer 301 indicates that the re-establishment procedure has failed so the UE either enters RRC_Idle mode or attempts to initiate a subsequent re-establishment procedure. Table 1 below provides a summary of the timers and parameters associated with radio link failure in an LTE system.

TABLE 1

| Timer | Start | Stop | At expiry |
|---|---|---|---|
| T300 | Transmission of RRCConnectionRequest | Reception of RRCConnectionSetup or RRCConnectionReject message, cell re-selection and upon abortion of connection establishment by upper layers | Reset MAC and Mac configuration. Inform upper layers about the failure |
| T301 | Transmission of RRCConnectionReestablishment Request | Reception of RRCConnectionReestablishment or RRCConnectionReestablishmentReject message as well as when the selected cell becomes unsuitable | If security is not activated: go to RRC_IDLE else: initiate the connection re-establishment procedure |
| T304 | Reception of RRCConnectionReconfiguration message including the MobilityControl Info or reception of MobilityFromEUTRACommand message including CellChangeOrder | Criterion for successful completion of handover to EUTRA or cell change order is met (the criterion is specified in the target RAT in case of inter-RAT) | In case of cell change order from E-UTRA or intra E-UTRA handover, initiate the RRC connection re-establishment procedure; In case of handover to E-UTRA, perform the actions defined in the specifications applicable for the source RAT. |
| T310 | Upon detecting physical layer problems i.e. upon receiving N310 consecutive out-of-sync indications from lower layers | Upon receiving N311 consecutive in-sync indications from lower layers, upon triggering the handover procedure and upon initiating the connection re-establishment procedure | If security is not activated: go to RRC_IDLE else: initiate the connection re-establishment procedure |
| T311 | Upon initiating the RRC connection re-establishment procedure | Selection of a suitable E-UTRA cell or a cell using another RAT. | Enter RRC_IDLE |

TABLE 1-continued

| Constant | Usage |
|---|---|
| N310 | Maximum number of consecutive "out-of-sync" indications received from lower layers |
| N311 | Maximum number of consecutive "in-sync" indications received from lower layers |

RRC establishment and re-establishment procedures are partially performed over random access channels and are relatively resource intensive compared to standard operations of a UE. Consequently, it is beneficial to avoid radio link failure. One method to avoid radio link failure is to perform handover to a target eNode B when the radio link quality of the serving eNode B deteriorates sufficiently.

Handover

In order to avoid radio link failure, a UE may perform a number of measurements and detect events that indicate that action may be required to avoid radio link failure. For instance, a UE may perform radio link quality measurements on the serving and neighbouring cells and then report these measurements to the serving eNode B based on the occurrence the of the following events as defined in the LTE standard.

Event A1: Serving cell becomes better than absolute threshold

Event A2: Serving cell becomes worse than absolute threshold

Event A3: Neighbour cell becomes amount of offset better than serving cell

Event A4: Neighbour cell becomes better than absolute threshold

Event A5: Serving cell becomes worse than absolute threshold1 and neighbour cell becomes better than another absolute threshold2

Each of the events A1 to A5 may trigger a different procedure in a UE, for example, events A1 and A2 may trigger the end and beginning, respectively, of inter-frequency and or intra-frequency measurements. These measurements may be required to establish the suitability of other carriers in the same cell or the carriers of neighbouring cells for handover. Similarly, the detection of event A5 indicates that a handover may be required based on measurements gathered in response to event A2.

Figure 6:
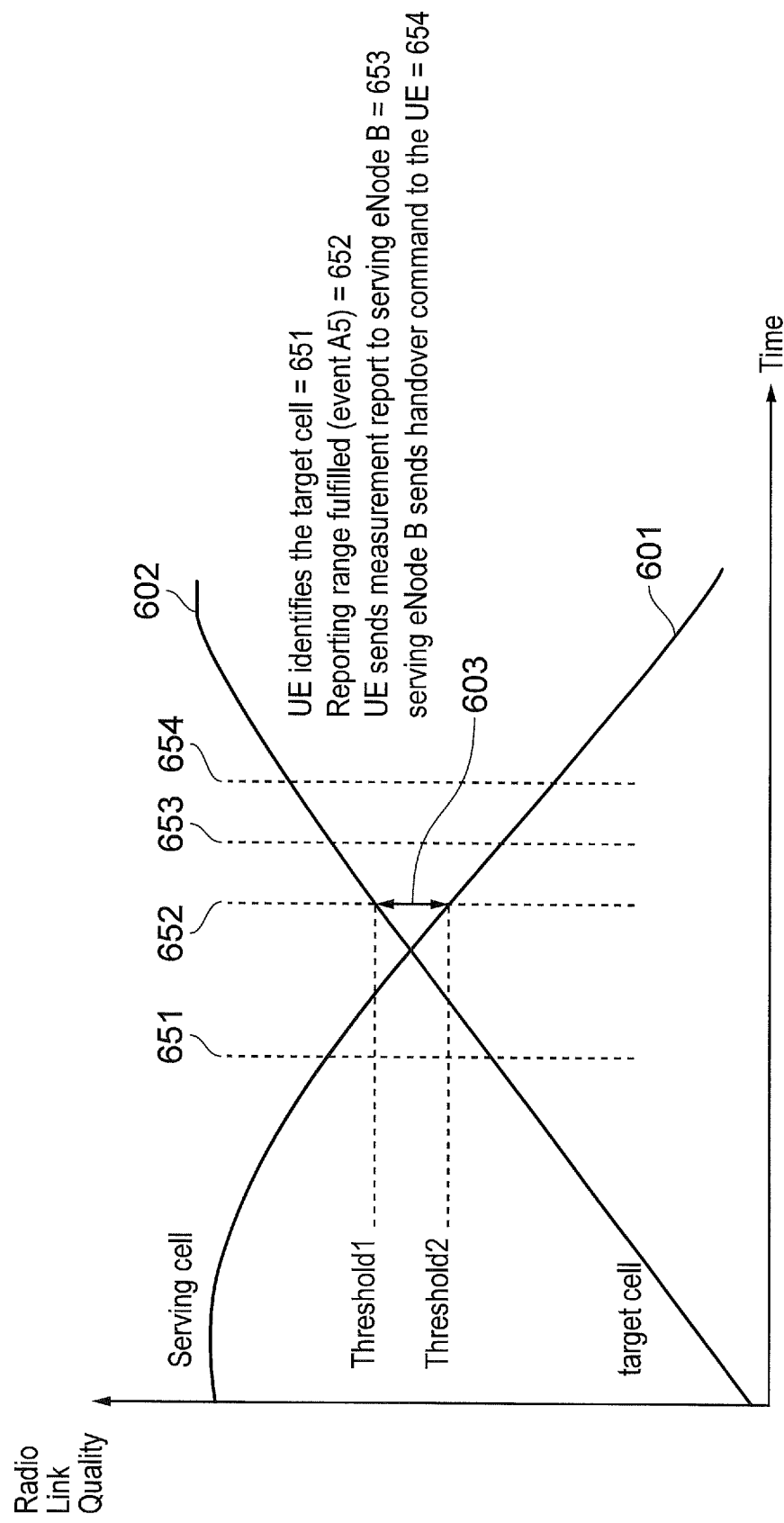
FIG. 6 provides a schematic diagram of received signal strength and associated measurement events at a LTE UE.

FIG. 6 illustrates the actions a UE may perform when radio link quality measurements indicate that the radio link quality of the signals from the serving and neighbouring cells are changing. As can be seen in FIG. 6, the radio link quality of the serving cell 601 is deteriorating and the radio link quality from the neighbour or target cell 602 is improving. Firstly, at 651 the UE identifies a target cell and then monitors the radio link quality of both the serving and target cell. At 652 the conditions corresponding to event A5 occur, in particular, the radio link quality of the serving cell has deteriorated below an absolute threshold and the radio link quality of the target cell has increased above an absolute radio link quality, where the difference between the radio link qualities of the two cells is represented by 603. Soon after event A5 has been detected the UE reports the radio link measurements to the eNode B at 653 and the eNode B then subsequently sends handover command instructions based on the reported measurements to the UE at 654. The UE in conjunction with the serving eNode B then performs a handover to the eNode B of the target cell. The handover procedure thus allows a UE to maintain a connection to the mobile network and therefore remain in an RRC_Connected state. However, if reporting of the measurements is not completed within a short period of time after the event A5 or the event A5 is not triggered until the radio link quality of the serving cell deteriorates to such a level that the UE loses a connection to the serving cell, radio link failure may occur.

Radio Link Quality Measurement

In LTE, one method by which a UE measures the downlink radio quality is by comparing reference signal received power (RSRP) against various parameters and thresholds. For example, for out-of-sync and in-sync indications the radio link quality is required to fall below and rise above the parameters $Q_{out}$ and $Q_{in}$, respectively. When the downlink radio link quality of the serving cell estimated over the last 200 ms period becomes worse than the threshold $Q_{out}$ Layer 1 of the UE sends an out-of-sync indication to the higher layers. In a similar fashion, when the downlink radio link quality of the serving cell estimated over the last 100 ms period becomes better than the threshold $Q_{in}$, Layer 1 of the UE sends an in-sync indication to the higher layers. As illustrated in FIG. 4, the respective out-of-sync or in-sync indications must occur a number of times in order (n310 and n311, respectively) for the higher layers to take action with regards to radio link failure.

In LTE, the threshold $Q_{out}$ is defined as the level at which the downlink radio link cannot be reliably received and corresponds to 10% block error rate of a hypothetical PDCCH transmission taking into account the PCFICH errors. With regards to $Q_{in}$, it is defined as the level at which the downlink radio link quality can be significantly more reliably received than at $Q_{out}$ and corresponds to 2% block error rate of a hypothetical PDCCH transmission taking into account the PCFICH errors. Although other mechanisms exist to detect radio link failure, the user of RSRP is particularly useful because it does not relay on the sending and receiving of data but instead simply the monitoring the received power on a portion of the wireless access interface.

As well as using radio link quality measurements for an indication of radio link failure, they may also be utilised for providing the measurements which trigger the events A1 to A5 at the UE. For example if the radio link quality of the serving cell fall below Threshold_1 and the radio link quality of the neighbouring cell rises above Threshold_2 then event A5 will be triggered. In order to avoid the possibility of the same events occurring within a short period of time, hysteresis may be introduced into the thresholds so that a UE does not continuously report events A1 and A2 for example due to a radio link quality measurement varying around a threshold. Alternatively, the conditions for the various events may be required to be satisfied for a minimum period of time before an event is triggered.

The use of RSRP is also suited for measurement of radio link quality at UEs which are in DRX because it does not required the detection and estimation of the data but instead only the received power of reference symbols in particular portions of the downlink subframes. The use of RSRP measurements therefore allows a UE in a DRX_Opportunity to take radio link quality measurements.

DRX and Radio Link Failure

The radio link failure mitigation techniques and handover techniques described up to now are primarily designed for use by UEs which are operating in conventional communication modes i.e. not DRX. Consequently, the use of the existing events A1 to A5 to trigger handover for devices which are in a DRX may not be adequate to avoid radio link failure.

Figure 7:
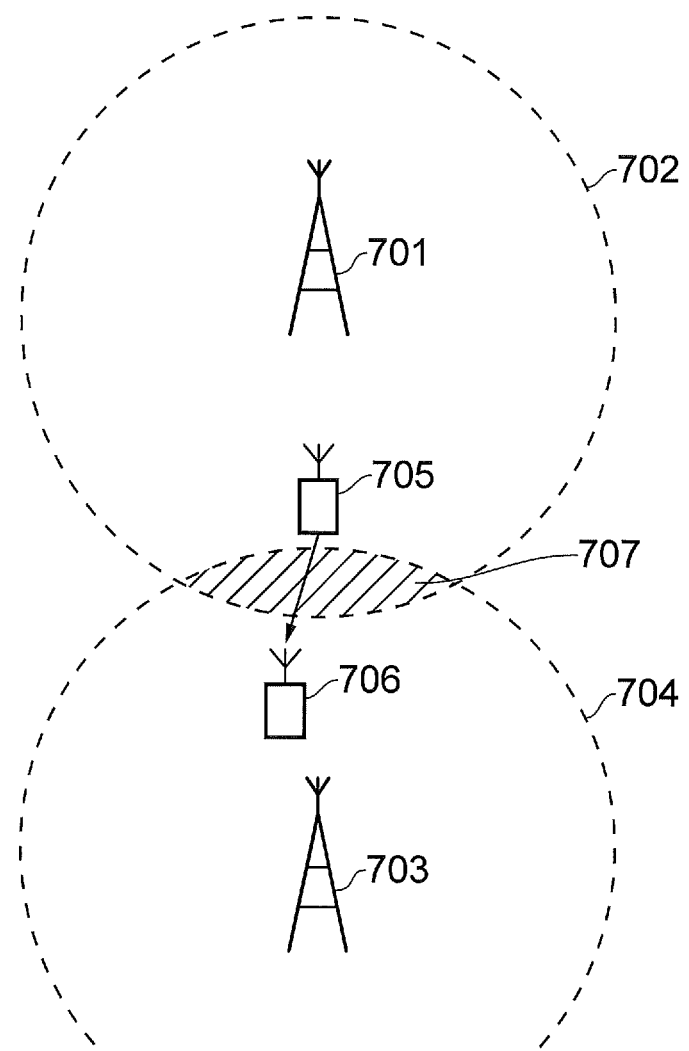
FIG. 7 provides a schematic diagram of a mobile communications network where radio link failure may occur.

When in a DRX state a UE may perform radio link quality measurements whenever it chooses but it is not required to report any of those measurements outside DRX_On periods. Conventionally, for a UE in DRX it will be configured to report any measurement related events via periodic scheduled PUSCH transmission which occur during DRX_On periods. Thus it is likely that the eNode B is not aware of imminent radio link failure until it already has taken place. FIG. 7 illustrates this problem where a first eNode B 701 provides coverage in a cell 702, and a second eNode B 703 provides coverage to a second cell 704. Initially a UE in DRX is positioned at 705 and is served by eNode B 701, however, during a DRX_Opportunity the UE moves to position 706 at which it cannot receive signals from the eNode B 701 but is not connected to eNode B 703. Consequently, the UE will experience radio link failure because measurement reports have not been sent to eNode B 703 as the UE move between positions 705 and 706 and a handover procedure not initiated. The area 707 represents an area that a UE is able to receive signals from both eNode Bs and therefore may correspond to the point 651 in FIG. 6. However, the steps 652 to 654 are due to occur before a radio link failure has occurred and so cannot be performed. Consequently a resource intensive re-establishment procedure is required to be carried out as opposed to a handover procedure.

Figure 8:
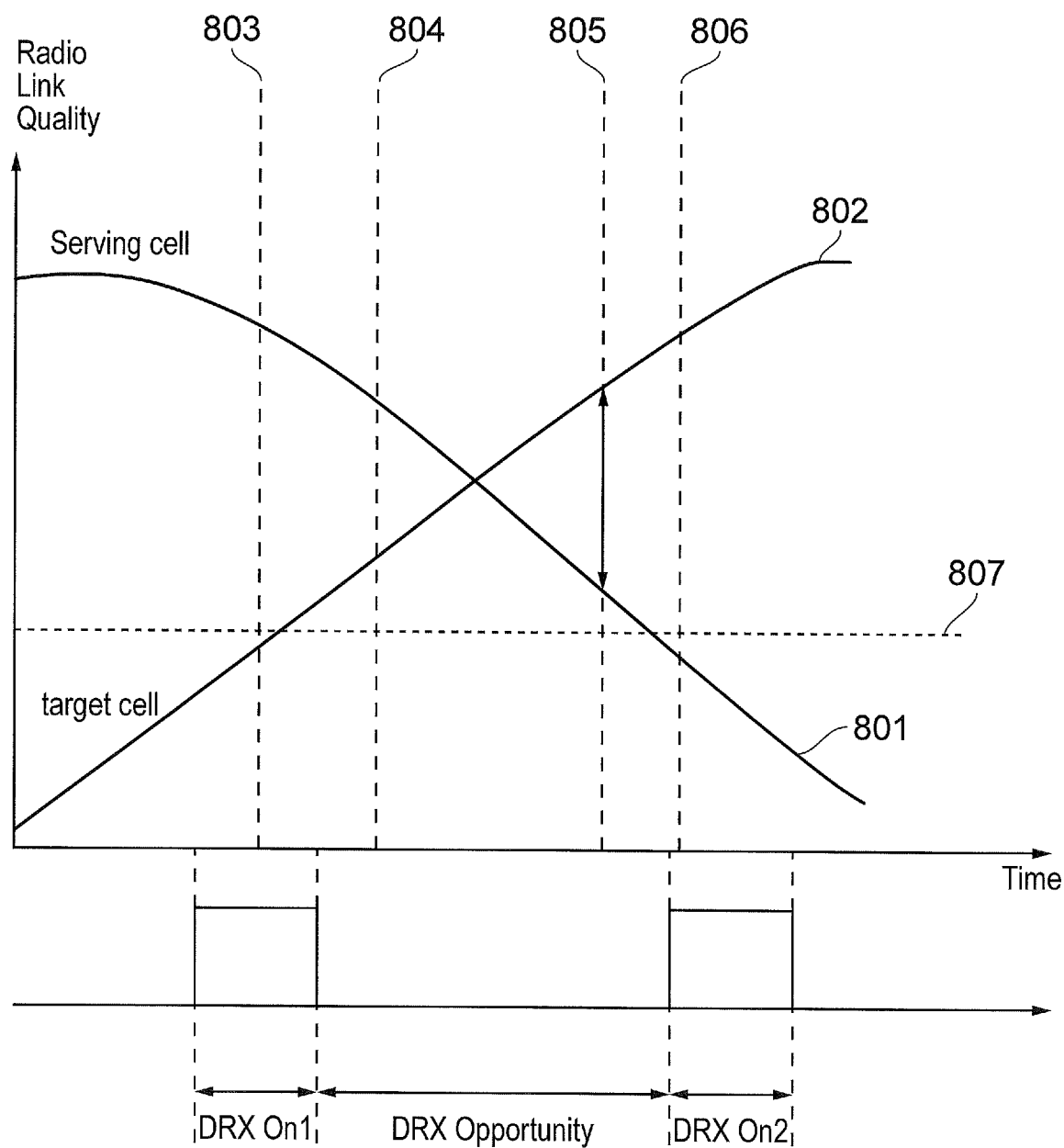
FIG. 8 provides a schematic diagram of received signal strength and associated measurement events at an LTE UE in a DRX state.

FIG. 8 provides an illustration of radio link failure that may occur when a UE is in a DRX state and moving between cells, or when channel conditions change so that the serving cell's radio link quality 801 deteriorates and the target cell radio link quality improves. At point 802 during DRX_On1 the UE communicates with the serving eNode B and then enters the DRX_Opportunity during which it does not detect and estimate data transmitted from the serving eNode B. During the DRX_Opportunity at 804 and 805, the UE performs radio link quality measurements, however these measurements are not reported to the eNode B. The measurements taken at 805 trigger event A5 but since the UE is in a DRX_Opportunity, this event is not reported to the eNode B until 806 when the UE has entered DRX_On2. However, by this point the serving cell radio link quality has deteriorated below threshold 807 and therefore radio link failure has occurred. Consequently, the A5 report may not be received by the eNode B and handover instructions not be received by the UE. As a result of the lack of handover the UE will then be required to perform connection re-establishment as previously described.

Although in FIG. 8 the late reporting of measurement is caused by a single comparatively long DRX opportunity, the presence of multiple shorter DRX period may also cause a delay in detecting deteriorating radio link quality and handover conditions. For example, it may be required that radio link quality measurements are taken over a predetermined number of DRX cycles whereby it takes an extended period of time to detect measurement events which correspond to events A1 to A5. For example a UE may complete measurements over five DRX cycles resulting in a delay of over 10 s in sending measurement reports for the longest DRX cycle in LTE.

In other examples, UEs may only perform radio link quality measurements during DRX_On periods and this may mean that the measurements of the parameter that indicate an event such as A5 may only be detected significantly after the event A5 occurred. For instance, in FIG. 8, if measurements were only conducted during DRX_On period, although the event A5 occurred at 805, it will only be detected by the UE at 806 and therefore radio link failure will have already occurred.

The problems arising from DRX and radio link failure may be more or less likely to occur for different classes of UE. For instance, MTC devices are configured to be low power and a primary means to achieving this is for to remain in a DRX state for extended periods of time, where the DRX_On periods within DRX are relatively short. Consequently, it is more likely that a MTC will experience radio link failure before event reports have been sent to the eNode B and or a handover procedure completed. Conversely, higher bandwidth devices such as smartphones are likely to enter a DRX state for a shorter period of time and therefore the likelihood of radio link failure whilst in a DRX state is reduced.

Radio Link Failure Mitigation Techniques

In accordance with an example embodiment, a new LTE UE measurement event is defined. The new measurement event is directed towards UEs in a DRX state and identifies when a radio link quality from a serving cell falls below a threshold. The occurrence of the event may be indicated by a single Q measurement, multiple measurements or averaged measurements and the event may be referred to as event A6. This event does not require a target cell quality measurement and therefore differs from event A5 in that it is solely determined by the serving cell. Upon detection of A6 a UE in a DRX state is configured to return to fully active operation and perform a scheduling request for resources in an uplink control channel such as the physical uplink control channel (PUCCH). The UE then indicates to the serving eNode B that an A6 event has been detected. This process thus ensures that the UE is connected to the eNode B and outside of a DRX state when a subsequent A5 event occurs so that such an event can be quickly reported to the eNode B and a handover over procedure performed as necessary. This procedure reduces the likelihood of radio failure occurring before either the A5 event is reported and/or handover procedure commenced as illustrated in FIG. 8. Once the UE has exited DRX it behaves in a conventional manner and therefore in addition to event A5, would also monitor for the other events A1 to A4 and report them to the eNode B accordingly. The reduced probability of radio link failure resulting from the definition of the new event A6 will lead to fewer re-establishment procedures and therefore UE resources will be conserved. This is particularly beneficial for MTC device which are likely to have long DRX_Opportunities and therefore are at an increased risk of radio link failure. Accordingly, the threshold that determines the occurrence of the new event may in some embodiments be adapted primarily for use with MTC devices.

Figure 9:
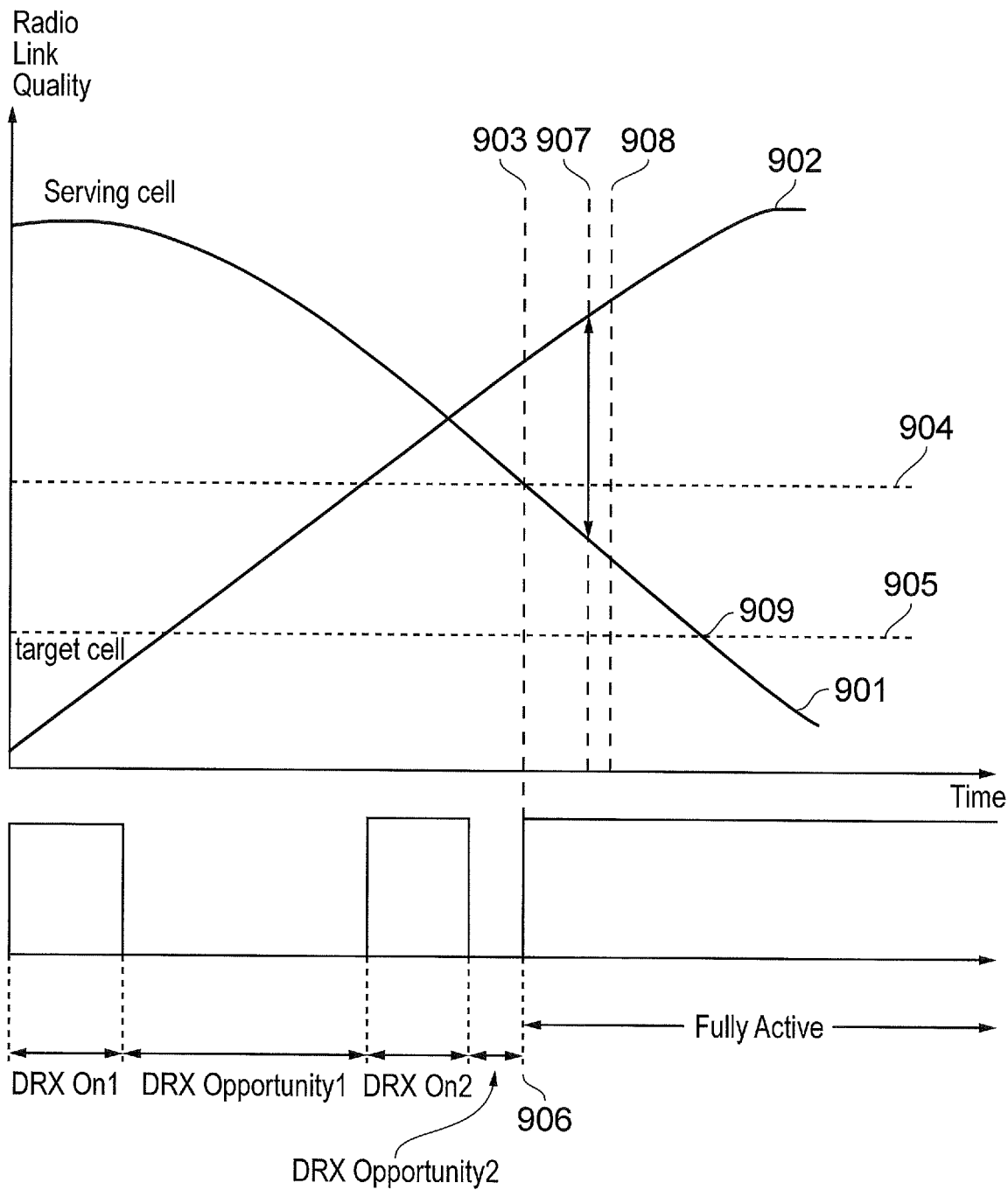
FIG. 9 provides a schematic diagram of received signal strength and associated measurement events at a UE in a DRX state in accordance with an example embodiment of the present invention.

FIG. 9 provides a signal diagram illustrating the effect of the new event A6 in a situation where the radio link quality of the serving cell 901 is deteriorating and the radio link quality of a neighbouring target cell 902 is improving. At 903 the event A6 is trigged by the radio link quality of the serving cell dropping below the newly defined threshold 904. At this point the UE exits the DRX state, and establishes a full connection with the eNode B 906. Once a connection has been established and resource allocated to the UE in the uplink, the UE then reports the A6 event and the associated measurements to the eNode B. Subsequently when the event A5 occurs at 907 the EU can report the event at 908 with reduced delay and a handover procedure commenced before a radio link failure occurs at 909. This therefore reduces the probability that a radio link failure will occur before a handover procedure has commenced, thus in turn reducing the likelihood that a re-establishment procedure will be required. Consequently, power consumption may be reduced at the UE due to reduced likelihood of reestablishment procedures. The UE may remain in a fully active state until a handover procedure is completed and or the eNode B of the serving cell instructs the UE to enter a new DRX cycle. For example, if after event A6 has occurred the single quality of the serving eNode B improves the UE will remain in fully active operation until it is instructed by the serving cell to enter a new DRX cycle.

Although event A2 provides a measurement event that detects when the radio link quality of a serving cell fall below a threshold, this event is predominantly used to indicate that the UE should start inter-frequency and or intra-frequency measurements. Likewise, event A1 is predominantly used to indicate to a UE that it should stop inter-frequency and or intra-frequency measurements. Event A6 is a distinct from events A1 and A2 and provides a distinct functionality, consequently the threshold for event A6 is required to be set separately. For instance, it may be preferable for the UE to exit DRX and become fully active fewer times than beginning inter-frequency measurements otherwise the EU will frequently exit DRX and its power consumption increase accordingly. In setting the A6 event threshold it is likely that a compromise will have to be made between the likelihood that a UE may be brought out of DRX and the likelihood of radio link failure, the compromise being based on the relative power consumed by each of these procedures and the probability of each procedures occurring. For instance, lowering the threshold would result in fewer A6 events occurring but an increased likelihood of radio link failure. A further difference between the existing events and A6 is that when in DRX, the UE only reports events A1 to A5 when it is in a DRX_On period and it has scheduled uplink resources. These events may also be triggered regardless of the state the UE is in. In contrast, A6 brings the UE out of a DRX cycle and in some embodiments may only be applicable in DRX periods. The use of a separate event defined is this manner also allows the targeting of radio link failure without requiring the use of other events or thresholds The threshold for determining A6 may be predetermined or may be fixed. For instance, in some example embodiments the threshold may be hardcoded into a UE or a UE may be informed of the threshold or the hardcoded threshold updated when a UE first enters the coverage area of an eNode B. In other example embodiments, the eNode B may be operable to dynamically alter the threshold in order to control the probability of re-establishment procedures occurring and the probability of devices exiting DRX. For example, in a congested network it may be beneficial for the threshold to be lowered in order to reduce the probability that a UE will exit DRX and therefore occupy resource of the wireless access interface. In addition to exiting DRX when event A6 occurs, the UE may also be configured to perform measurement of the radio link quality of neighbouring cells in anticipation of a handover procedure. The measurements of neighbouring cells may be based on information provided by a neighbouring cell list provided to the UE or by directly detecting signals from neighbouring cells.

Figure 10:
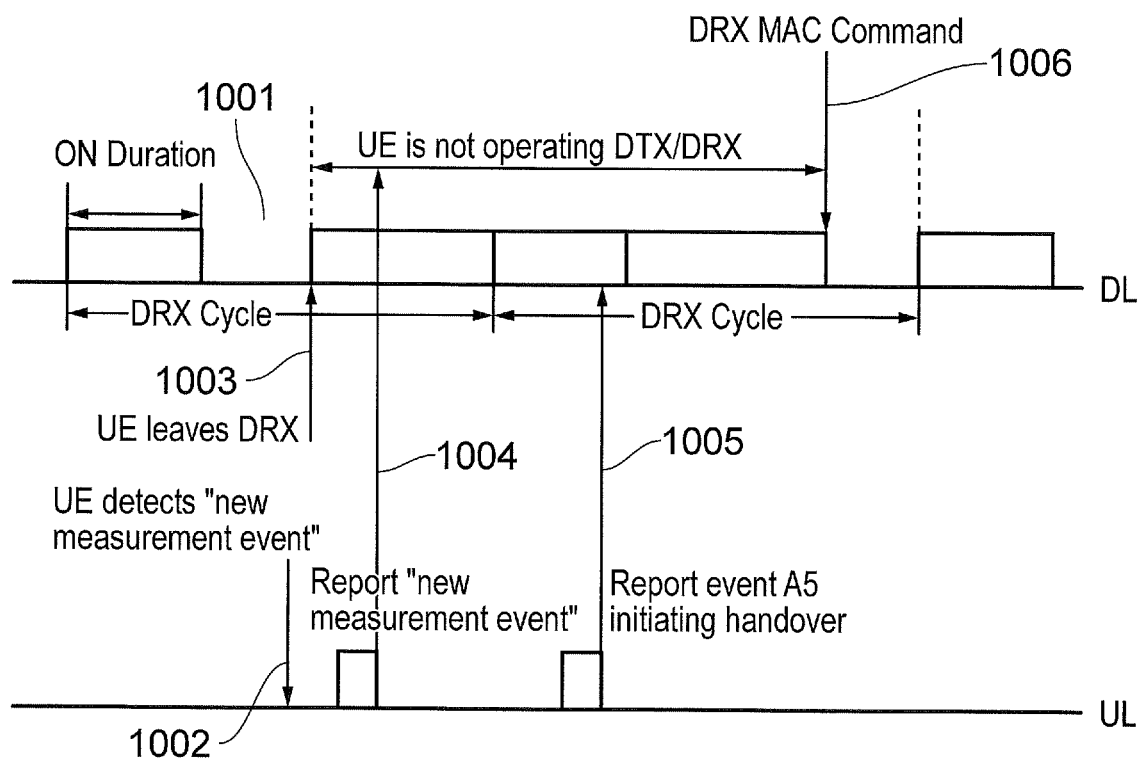
FIG. 10 provides a schematic diagram of the timing of receive signal strength measurement events at a UE in a DRX state in accordance with an example embodiment of the present disclosure.

FIG. 10 provides an alternative illustration of the new A6 event and how it interacts with DRX. At 1001 the UE is in a DRX_Opportunity and is performing radio link quality measurements on its serving cell. At 1002 the UE detects the A6 measurement event and exits DRX at 1003 in order to establish a fully active connection with the eNode B. Once uplink resources have been requested and granted, the UE reports the measurement event to the eNode B at 1004. The UE then remains out of DRX and at 1005 it detects event A5 and a handover procedure commences. Once the handover procedure is completed or the radio link quality of the serving cell improves sufficiently, the UE may then be instructed to a return to a DRX state at 1006 by its serving eNode B.

Figure 11:
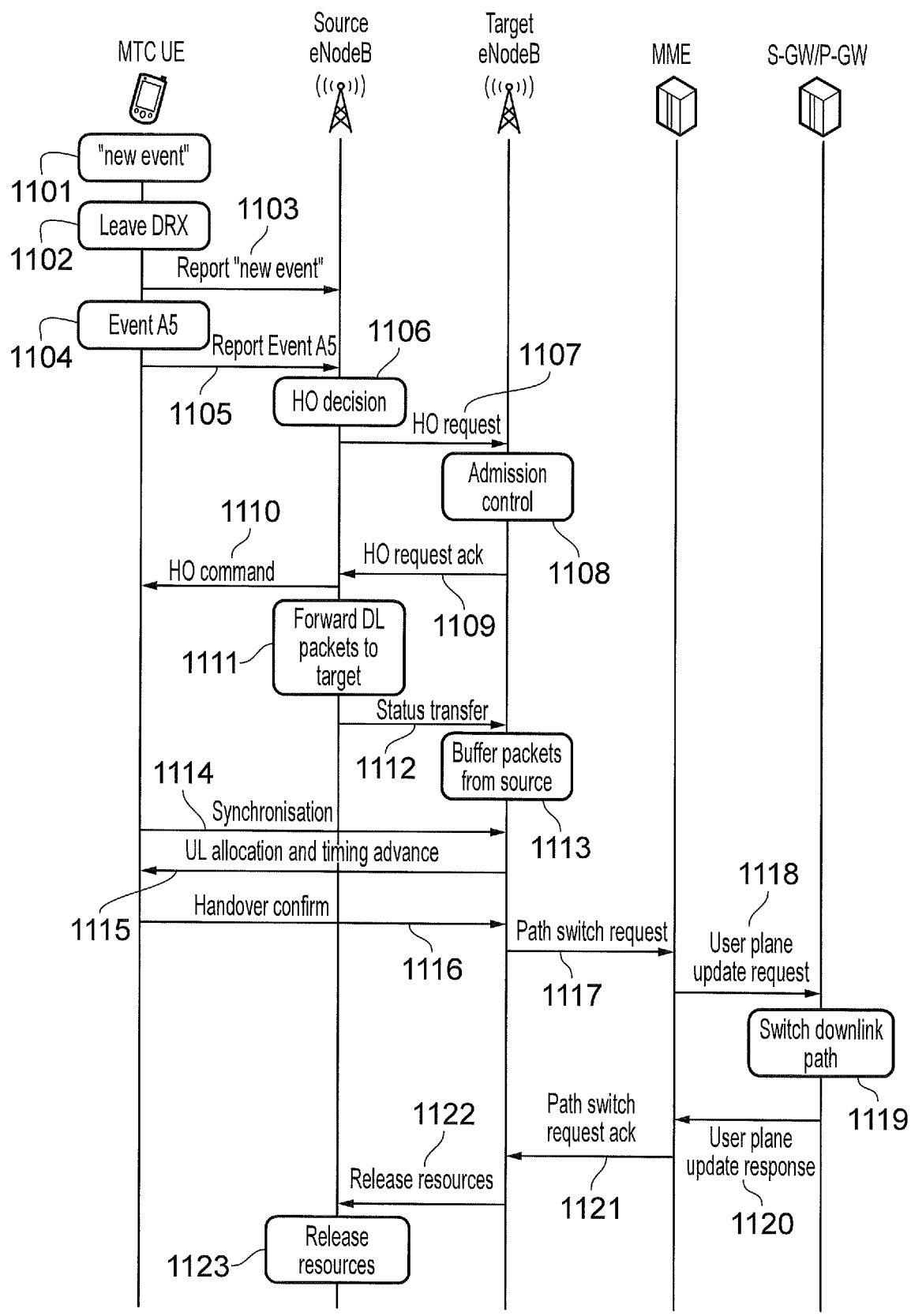
FIG. 11 provides a schematic diagram of a handover procedure in an LTE network in accordance with an example embodiment of the present disclosure.

FIG. 11 provides an illustration of a handover procedure between eNode Bs that may occur in an LTE system when an A6 event is detected and a subsequent A5 event is detected. Initially the UE performing DRX and detects the new event A6 at 1101. The UE then exits DRX 1102, establishes a fully active connection with eNode B and reports the event 1103. Subsequently, an A5 event 1104 is detected and the UE reports the event to the eNode B 1105 upon which a handover decision 1106 is based. The reporting of this event triggers the beginning of the handover procedure and the eNode B makes a handover request 107 to the admission control element 1108 of a target eNode B. A handover acknowledgment 1109 is then sent from the target eNode B to the serving eNode B and a subsequent handover command 1110 is sent to the UE. At this point forwarding of the downlink packets 1111 to the target node the serving node begins. A status transfer 1112 is sent from the serving eNode B to the target eNode B and the target eNode B begins to buffer packets destined for the UE 1113. Once 1112 is complete the UE synchronises with the target eNode B 1114 and is allocated an uplink timing advance 1115 in order to maintain synchronisation with the uplink and a handover confirmation message 1116 is then sent from the UE to the target eNode B to which it is now connected. Once the handover confirm message has been received, configuration of the higher layers if performed. For instance, a path switch requests 1117 is sent from the target eNode B to the (MME) and a user plane update request 1118 is then sent from the MME to the serving gateway (S-GW). The S-GW then switches the downlink path 1119 and sends a user plane update response 1120 to the mobility management entity (MME) which is turn sends a path switch request acknowledgment 1121 to the target eNode B. The target eNode B then sends a resource released message 1122 to the serving eNode B which indicates that it may now release the resources previously allocated to the EU 1123. The handover procedure is then complete.

Although throughout the description, the use of RSRP have been used to measurement signal quality, this is simply one of several means by which the radio link quality can be measured. For instance, reference signal receive quality (RSRQ) may be used to indicate the quality of the received signal as well as the strength. This is measured by calculating the RSRP to the evolved-universal terrestrial radio access (E-UTRA) carrier received signal strength indicator (RSSI). Furthermore, the frequency of the signal quality measurements performed by a UE in a DRX state may vary. For instance, measurements may be performed periodically so that there is a slight delay between the signal quality dropping below threshold A6 and the event A6 being detected. However, this delay would in most circumstances be significantly less than the delay associated with detecting and reporting an A5 event in existing systems. The frequency of measurements may once again be a trade-off between power consumption and the likelihood of radio link failure. For example, the higher the frequency of signal quality measurements the higher the power consumption of a UE in a DRX state but the lower the likelihood of radio link failure.

Figure 12:
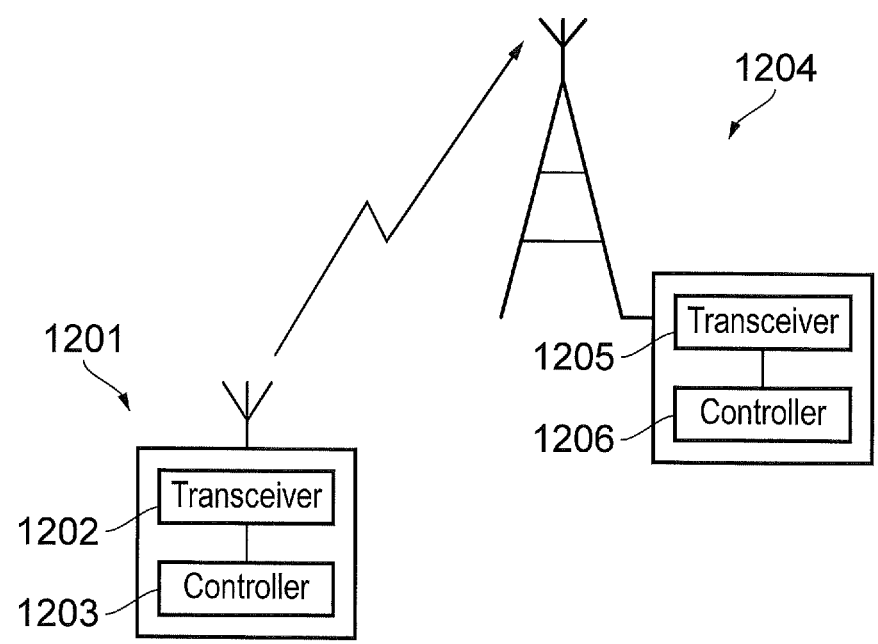
FIG. 12 provides a schematic diagram of a communications terminal and an infrastructure equipment.

FIG. 12 provides a schematic diagram of a UE 1201 and an eNodeB 1204 in which the technique described above may be implemented. The UE includes a transceiver 1202 for transmitting and receiving signals representing data to and from the eNodeB, and a controller 1203 operable to control the transceiver 1202 and other functions of the UE. In combination, the transceiver 1202 and controller 1203 may allow the UE to enter and exit DRX cycles of various durations, send messages for requesting resources to en eNodeB, receive resource allocation messages from the eNodeB, and measure parameters of received signals. Although the UE has been illustrated as including a transceiver 1202 and a controller 1203, the UE is not limited to including these elements and may also include further elements such as memory for example. The eNodeB 1204 includes a transceiver 1205 for transmitting and receiving signals representing data to and from the UE and a controller 1206 operable to control the transceiver 1205 and other functions of the eNodeB 1204. In combination, the transceiver 1205 and controller 1206 may receive messages requesting resources from the UE and send resource allocation messages to the UE. As for the UE, although the eNodeB 1204 has been illustrated as including a transceiver and a controller, the eNodeB is not limited to including these elements and may also include further elements such as memory for example.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

The following numbered clauses provide further example aspects and features of the present technique:

1. A communications system for communicating data to and from a communication terminal, the system comprising infrastructure equipment for forming a mobile communications network, and a communications terminal, the infrastructure equipment being arranged to transmit and receive signals representing data to and from the communication terminal via a wireless access interface, the communication terminal being configured to receive and to transmit the signals representing the data to and from the infrastructure equipment, and wherein the communication terminal is configured to enter a reduced-power state, during which the communication terminal is configured to periodically recover data from the signals received from the infrastructure equipment, to measure a parameter indicating a characteristic of at least some of the signals received from the infrastructure equipment during the reduced power state, and in dependence on upon the measured parameter relative to a predetermined threshold, to exit the reduced power state and to transmit a message to the infrastructure equipment, the message requesting resources of the wireless access interface, and the infrastructure equipment is configured to receive the message for requesting resources and in response allocate resources of the wireless access interface to the communications terminal.

2. A communications system according to clause 1, wherein the reduced-power state includes a first period during which the communication terminal is configured to recover data from the signals received from the infrastructure equipment and a second period during which the communication terminal is configured not to recover data from the signals received from the infrastructure equipment, and the communication terminal is configured to measure the parameter during the second period.

3. A communications system according to clause 1 or 2, wherein the communications terminal is configured to transmit a reporting message to the infrastructure equipment in the allocated resources, the reporting message indicating the measured parameter relative to the threshold.

4. A communications system according to any of clauses 1 to 3, wherein the measured parameter includes a received power of a reference signal transmitted by the infrastructure equipment 5. A communications system according to any of clauses 1 to 4, wherein the predetermined threshold is higher than a threshold associated with a handover initiating event.

6. A communications system according to any of clauses 1 to 5, wherein the predetermined threshold is determined by the infrastructure equipment and the communications terminal is provided with an indication of the predetermined threshold.

7. A communications system according to any of clauses 1 to 5, wherein the predetermined threshold is hardcoded into the communications terminal.

8. An communications terminal comprising a transceiver unit configured to transmit and to receive signals representing data to and from an infrastructure equipment via a wireless access interface, and a controller configured in combination with the transceiver unit to enter a reduced-power state, during which the communication terminal is configured to periodically recover data from the signals received from the infrastructure equipment, to measure a parameter indicating a characteristic of at least some of the signals received from the infrastructure equipment during the reduced power state, and in dependence upon the measured parameter relative to a predetermined threshold, to exit the reduced power state and to transmit a message to the infrastructure equipment, the message requesting resources of the wireless access interface.

9. A communications terminal according to clause 8, wherein the reduced-power state includes a first period during which the communication terminal is configured to recover data from the signals received from the infrastructure equipment and a second period during which the communication terminal is configured not to recover data from the signals received from the infrastructure equipment, and the communication terminal is configured to measure the parameter during the second period.

10. A communications terminal according to clause 8 or 9, wherein the communication terminal is configured to transmit a reporting message to the infrastructure equipment in resources allocated by the infrastructure equipment in response to receiving the request for resources, the reporting message indicating the measured parameter relative to the predetermined threshold.

11. A communications terminal according to any of clauses 8 to 10, wherein the measured parameter is a received power of a reference signal transmitted by the infrastructure equipment.

12. A communications terminal according to any of clauses 8 to 11, wherein the predetermined threshold is higher than a threshold associated with a handover initiating event.

13. A communications terminal according to any of clauses 8 to 12, wherein the communications terminal is provided with an indication of the predetermined threshold by the infrastructure equipment.

14. A communications terminal according to any of clauses 8 to 12, wherein the predetermined threshold is hardcoded into the communications terminal.

15. An infrastructure equipment comprising a transceiver arranged to transmit and to receive signals representing data to and from a communication terminal via a wireless access interface, the communication terminal configured to transmit and to receive signals representing data to and from the infrastructure equipment, and the communications terminal is configured to enter a reduced-power state, during which the communication terminal is configured to periodically recover data from the signals received from the infrastructure equipment, to measure a parameter indicating a characteristic of at least some of the signals received from the infrastructure equipment during the reduced power state, and to exit the reduced power state and to transmit a message for requesting resources of the wireless access interface to the infrastructure equipment in dependence upon the parameter measurement relative to a predetermined threshold, and the infrastructure equipment comprising a controller configured in combination with the transceiver
to receive the message for requesting resources and in response allocate resources of the wireless access interface to the communications terminal.

16. A method for communicating data to and from a communication terminal, the system comprising infrastructure equipment for forming a mobile communications network arranged to transmit and receive signals representing data to and from the communication terminal via a wireless access interface, the communication terminal configured to transmit and receive signals representing the data to and from the infrastructure equipment, the method comprising
entering a reduced-power state at the communications terminal, during which the communication terminal is configured to periodically recover data from the signals received from the infrastructure equipment,
measuring a parameter indicating a characteristic of at least some of the signals received from the infrastructure equipment during the reduced power state at the communications terminal,
exiting the reduced power state and transmitting a message to the infrastructure equipment, the message requesting resources of the wireless access interface, in dependence upon the measured parameter relative to a predetermined threshold, and
receiving the message for requesting resources at the infrastructure equipment and in response allocating resources of the wireless access interface to the communications terminal.

17. A method for communicating data to and receiving data from an infrastructure equipment from and to a communications terminal, the infrastructure equipment arranged to transmit and receive signals representing data to and from the communication terminal via a wireless access interface, the communication terminal configured to transmit and receive signals representing data to and from the infrastructure equipment, the method comprising
entering a reduced-power state, during which the communication terminal is configured to periodically recover data from the signals received from the infrastructure equipment,
measuring a parameter indicating a characteristic of at least some of the signals received from the infrastructure equipment during the reduced power state, and
exiting the reduced power state and transmitting a message to the infrastructure equipment, the message requesting resources of the wireless access interface, in dependence upon the measured parameter relative to a predetermined threshold.

The invention claimed is:
1. A communications system comprising:
a first base station;
a second base station;
a communication terminal configured to communicate with the first base station and the second base station at least by transmitting and receiving signals to and from the first base station and the second base station;
wherein the communication terminal is configured to:
enter a reduced-power state;
obtain data from the signals received from the first base station and the second base station during the reduced-power state;
measure a parameter indicating a characteristic of at least some of the signals received from the first base station and the second base station during the reduced-power state;
determine a first radio link quality level of the first base station and a second radio link quality level of the second base station based on the measured parameter;
determine that the first radio link quality level of the first base station is below a first threshold, wherein the first threshold is dynamically adjustable based on (i) a probability of a radio link failure with the first base station, (ii) a first power consumed by the communication terminal when exiting from the reduced-power state relative to a second power consumed by the communication terminal as a result of the radio link failure, and (iii) a probability of the communication terminal exiting from the reduced-power state;
exit the reduced-power state when the first radio link quality level of the first base station is below the first threshold;
transmit a first message to the first base station upon exiting the reduced-power state, wherein the first message includes a report on the first radio link quality level;
determine that the second radio link quality level of the second base station is above a second threshold while the first radio link quality level of the first base station is below the first threshold; and
transmit a second message to the first base station upon determining that the second radio link quality level is above the second threshold while the first radio link quality level is below the first threshold, wherein the second message includes a report on the first and second radio link quality levels and a request for uplink resources to commence a handover of the communication terminal from the first base station to the second base station;

wherein the first base station is configured to receive the first message and the second message from the communication terminal and to grant the uplink resources to the communication terminal based on the request in the second message.

2. The communications system as claimed in claim 1, wherein the reduced-power state includes a first period during which the communication terminal is configured to obtain the data from the signals and a second period during which the communication terminal is configured not to obtain the data from the signals, and wherein the communication terminal is configured to measure the parameter during the second period.

3. The communications system as claimed in claim 1, wherein the measured parameter includes a received power of a reference signal transmitted by the first base station.

4. The communications system as claimed in claim 1, wherein the second threshold is greater than the first threshold.

5. The communications system as claimed in claim 1, wherein the first threshold is determined by the first base station and the communications terminal is provided with an indication of the first threshold by the first base station.

6. The communications system as claimed in claim 1, wherein the first threshold is stored in a memory of the communication terminal.

7. A communication terminal comprising:
a transceiver configured to communicate with a first base station and a second base station of a plurality of base stations at least by transmitting and receiving signals to and from the first base station and the second base station; and
a controller configured to:
  enter a reduced-power state;
  obtain data from the signals received from the first base station and the second base station during the reduced-power state;
  measure a parameter indicating a characteristic of at least some of the signals received from the first base station and the second base station during the reduced-power state;
  determine a first radio link quality level of the first base station and a second radio link quality level of the second base station based on the measured parameter;
  determine that the first radio link quality level of the first base station is below a first threshold, wherein the first threshold is dynamically adjustable based on (i) a probability of a radio link failure with the first base station, (ii) a first power consumed by the communication terminal when exiting from the reduced-power state relative to a second power consumed by the communication terminal as a result of the radio link failure, and (iii) a probability of the communication terminal exiting from the reduced-power state;
  exit the reduced-power state when the first radio link quality level of the first base station is below the first threshold;
  transmit, via the transceiver, a first message to the first base station upon exiting the reduced-power state, wherein the first message includes a report on the first radio link quality level;
  determine that the second radio link quality level of the second base station is above a second threshold while the first radio link quality level of the first base station is below the first threshold;
  transmit, via the transceiver, a second message to the first base station upon determining that the second radio link quality level is above the second threshold while the first radio link quality level is below the first threshold, wherein the second message includes a report on the first and second radio link quality levels and a request for uplink resources to commence a handover of the communication terminal from the first base station to the second base station.

8. The communication terminal as claimed in claim 7, wherein the reduced-power state includes a first period during which the communication terminal is configured to obtain the data from the signals and a second period during which the communication terminal is configured not to obtain the data from the signals, and wherein the controller is configured to measure the parameter during the second period.

9. The communication terminal as claimed in claim 7, wherein the measured parameter is a received power of a reference signal transmitted by the first base station.

10. The communication terminal as claimed in claim 7, wherein the second threshold is greater than the first threshold.

11. The communication terminal as claimed in claim 7, wherein the communication terminal is provided with an indication of the first threshold by the first base station.

12. The communication terminal as claimed in claim 7, wherein the first threshold is stored in a memory of the communication terminal.

13. An infrastructure equipment comprising:
a transceiver configured to communicate with a communication terminal and a target base station at least by transmitting and receiving signals to and from the communication terminal and the target base station;
wherein the communication terminal is configured to:
  enter a reduced-power state;
  obtain data from signals received from the infrastructure equipment and the target base station during the reduced-power state;
  measure a parameter indicating a characteristic of at least some of the signals received from the infrastructure equipment and the target base station during the reduced-power state;
  determine a first radio link quality level of the infrastructure equipment and a second radio link quality level of the target base station based on the measured parameter;
  determine that the first radio link quality level of the infrastructure equipment is below a first threshold, wherein the first threshold is dynamically adjustable based on (i) a probability of a radio link failure with the first base station, (ii) a first power consumed by the communication terminal when exiting from the reduced-power state relative to a second power consumed by the communication terminal as a result of the radio link failure, and (iii) a probability of the communication terminal exiting from the reduced-power state; and
  exit the reduced-power state when the first radio link quality level of the infrastructure equipment is below the first threshold;
wherein the transceiver is further configured to receive a first message from the communication terminal upon the communication terminal exiting the reduced-power state, wherein the first message includes a report on the first radio link quality level, wherein the communication terminal is further configured to determine that the second radio link quality level of the target base station is above a second threshold while the first radio link quality level of the infrastructure equipment is below the first threshold, wherein the transceiver is further configured to receive a second message from the communication terminal upon the communication terminal determining that the second radio link quality level is above the second threshold while the first radio link quality level is below the first threshold, wherein the second message includes a report on the first and second radio link quality levels and a request for uplink resources to commence a handover of the communication terminal from the infrastructure equipment to the target base station; and a controller configured to grant the uplink resources to the communication terminal based on the request in the second message.

14. A method comprising:

communicating, via a communication terminal, with a first base station and a second base station of a plurality of base stations at least by transmitting and receiving signals to and from the first base station and the second base station;

entering a reduced-power state;

obtaining data from the signals received from the first base station and the second base station during the reduced-power state;

measuring a parameter indicating a characteristic of at least some of the signals received from the first base station and the second base station during the reduced-power state;

determining a first radio link quality level of the first base station and a second radio link quality level of the second base station based on the measured parameter;

determining that the first radio link quality level of the first base station is below a first threshold, wherein the first threshold is dynamically adjustable based on (i) a probability of a radio link failure with the first base station, (ii) a first power consumed by the communication terminal when exiting from the reduced-power state relative to a second power consumed by the communication terminal as a result of the radio link failure, and (iii) a probability of the communication terminal exiting from the reduced-power state;

exiting the reduced-power state when the first radio link quality level of the first base station is below the first threshold;

transmitting a first message to the first base station upon exiting the reduced-power state, wherein the first message includes a report on the first radio link quality level;

determining that the second radio link quality level of the second base station is above a second threshold while the first radio link quality level of the first base station is below the first threshold; and transmitting a second message to the first base station upon determining that the second radio link quality level is above the second threshold while the first radio link quality level is below the first threshold, wherein the second message includes a report on the first and second radio link quality levels and a request for uplink resources to commence a handover of the communication terminal from the first base station to the second base station.

15. A method comprising:

communicating with a communication terminal and a target base station at least by transmitting and receiving signals to and from the communication terminal and the target base station;

wherein the communication terminal is configured to:
  enter a reduced-power state;
  obtain data from signals received from an infrastructure equipment and the target base station during the reduced-power state;
  measure a parameter indicating a characteristic of at least some of the signals received from the infrastructure equipment and the target base station during the reduced-power state;
  determine a first radio link quality level of the infrastructure equipment and a second radio link quality level of the target base station based on the measured parameter;
  determine that the first radio link quality level of the infrastructure equipment is below a first threshold, wherein the first threshold is dynamically adjustable based on (i) a probability of a radio link failure with the first base station, (ii) a first power consumed by the communication terminal when exiting from the reduced-power state relative to a second power consumed by the communication terminal as a result of the radio link failure, and (iii) a probability of the communication terminal exiting from the reduced-power state; and
  exit the reduced-power state when the first radio link quality level of the infrastructure equipment is below the first threshold;

receiving a first message from the communication terminal upon the communication terminal exiting the reduced-power state, wherein the first message includes a report on the first radio link quality level, wherein the communication terminal is further configured to determine that the second radio link quality level of the target base station is above a second threshold while the first radio link quality level of the infrastructure equipment is below the first threshold;

receiving a second message from the communication terminal upon the communication terminal determining that the second radio link quality level is above the second threshold while the first radio link quality level is below the first threshold, wherein the second message includes a report on the first and second radio link quality levels and a request for uplink resources to commence a handover of the communication terminal from the infrastructure equipment to the target base station; and granting the uplink resources to the communication terminal based on the request in the second message.

* * * * *